US012644501B2

(12) United States Patent
Wang et al.

(10) Patent No.: US 12,644,501 B2
(45) Date of Patent: Jun. 2, 2026

(54) ELECTRONIC LOCK TRANSMISSION STRUCTURE, ELECTRONIC LOCK, AND MOTOR VEHICLE

(71) Applicant: Changchun Jetty Automotive Technology Co., Ltd., Changchun (CN)

(72) Inventors: Chao Wang, Changchun (CN); Jiacheng Li, Changchun (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 120 days.

(21) Appl. No.: 18/695,965

(22) PCT Filed: Sep. 28, 2022

(86) PCT No.: PCT/CN2022/122094
§ 371 (c)(1),
(2) Date: Mar. 27, 2024

(87) PCT Pub. No.: WO2023/051602
PCT Pub. Date: Apr. 6, 2023

(65) Prior Publication Data
US 2024/0401671 A1 Dec. 5, 2024

(30) Foreign Application Priority Data

Sep. 30, 2021 (CN) ......................... 202122387018.X

(51) Int. Cl.
*F16H 1/16* (2006.01)
*F16H 55/22* (2006.01)
*G07C 9/00* (2020.01)

(52) U.S. Cl.
CPC ............... *F16H 1/16* (2013.01); *F16H 55/22* (2013.01); *G07C 9/00944* (2013.01)

(58) Field of Classification Search
CPC .............. E05B 17/042; E05B 47/0012; E05B 2047/0014; E05B 2047/0017;
(Continued)

(56) References Cited

FOREIGN PATENT DOCUMENTS

| CN | 205777920 U | 12/2016 |
| CN | 206539145 U | * 10/2017 |

(Continued)

OTHER PUBLICATIONS

Trasnlation of CN206539145 (Year: 2017).*

(Continued)

*Primary Examiner* — Christine M Mills
*Assistant Examiner* — Yahya Sidky
(74) *Attorney, Agent, or Firm* — Renner, Otto, Boisselle & Sklar, LLP

(57) ABSTRACT

An electronic lock transmission structure, an electronic lock and a motor vehicle, including: a drive device with an output shaft; a transmission mechanism including an input end and an output end, and the input end is a transmission assembly connected to the output shaft, and the output end is a cam device; a lock rod, and one end of which is a free end, and the other end of which is connected to the cam device; and rotation of the output shaft is converted into a reciprocating movement of the lock rod through the transmission mechanism. The disclosed electronic lock transmission structure adopts a first worm and a second worm for transmission, which may provide a larger speed reduction ratio, thereby outputting a larger ejection force.

16 Claims, 1 Drawing Sheet

(58) Field of Classification Search
CPC ....... E05B 2047/002; E05B 2047/0022; E05B
53/008; E05B 81/34; E05B 81/36; E05B
81/38
USPC ................................................ 37/124; 55/22
See application file for complete search history.

(56)                    References Cited

FOREIGN PATENT DOCUMENTS

| | | | |
|---|---|---|---|
| CN | 207381641 U | 5/2018 | |
| CN | 211448138 U | 9/2020 | |
| CN | 113246758 A | 8/2021 | |
| CN | 217205899 U | 8/2022 | |
| DE | 10254129 B4 | 10/2014 | |
| EP | 3196388 A1 | 7/2017 | |
| JP | 2005232893 A | 9/2005 | |
| WO | WO-2022044025 A1 * | 3/2022 | ............. E05C 9/041 |

OTHER PUBLICATIONS

First Office Action issued on May 20, 2025 for counterpart Mexico patent Application No. MX/u/2024/000125, and its English translation.
International Search Report mailed Dec. 15, 2022, for International Application No. PCT/CN2022/122094.
Extended European Search Report dated Nov. 26, 2024, for European Application No. 22874986.7.

\* cited by examiner

ELECTRONIC LOCK TRANSMISSION STRUCTURE, ELECTRONIC LOCK, AND MOTOR VEHICLE

The present disclosure is a National Stage of International Application No. PCT/CN2022/122094 filed on Sep. 28, 2022, which claims priority to Chinese Patent Application NO. 202122387018.X, entitled "electronic lock transmission structure, electronic lock and motor vehicle", and filed on Sep. 30, 2021, both of which are hereby incorporated by reference in their entireties.

TECHNICAL FIELD

The present disclosure relates to the technical field of electronic lock manufacture, in particular to an electronic lock transmission structure, an electronic lock and a motor vehicle.

BACKGROUND

With the vigorous development of the automobile industry, new energy electric automobiles with features such as clean energy, quiet driving, pollution-free emissions during driving are more and more popular with the public, and the charging gun related to the new energy electric automobile play a crucial role in the electric automobile, so get more and more attention by manufacturers. Meanwhile, widespread use of the charging gun makes electronic locks of the charging gun get more and more people's attention, types of the electronic lock are also diverse. In this competitive market, stability, sensitivity and energy-saving durability of the electronic lock have become research focuses of each manufacturer. As well known, an electronic lock generally uses a micro motor with a smaller current, and in order to achieve a larger rotation torque of the micro motor, the micro motor generally rotates at a high speed. A drive device in this traditional electronic lock will generate a frictional force due to mutual engagement between transmission mechanisms and a change from circular rotation to a linear motion, which greatly consumes electric energy and a motor torque, not only leads to a too short service life of a battery of the electronic lock, is easy to produce noise, but also easily causes the wear of a micro motor gear set and the instability of an electronic lock drive device. Therefore, for the sake of security, the main engine plants make an important core requirement on an ejection force of the electronic lock, however current electronic locks have a straight gear structure, a helical gear structure, or bevel gear structure, speed reduction ratios are generally smaller, ejection forces are insufficient, therefore in prior arts, a new solution is urgently needed to solve the above problems.

SUMMARY

The purpose of the present disclosure is to provide an electronic lock structure with a high ejection force.

The present disclosure provides an electronic lock transmission structure, including:

a drive device with an output shaft;

a transmission mechanism including an input end and an output end, and the input end is a transmission assembly connected to the output shaft, and the output end is a cam device;

a lock rod, and one end of which is a free end, and the other end of which is connected to the cam device; and rotation of the output shaft is converted into a reciprocating movement of the lock rod through the transmission mechanism.

In an exemplary embodiment, the reciprocating movement is one or more selected from telescoping, translating, rotating, swinging, bending and twisting.

In an exemplary embodiment, the transmission assembly is a first worm.

In an exemplary embodiment, an output torque of the output shaft is 2.4 N·mm to 10.8 N·mm.

In an exemplary embodiment, an output power of the drive device is 0.65 W to 6.2 W.

In an exemplary embodiment, the transmission mechanism further includes a transmission gear and an output gear, the transmission gear includes a first gear engaged with the first worm, and a second worm provided coaxially with the first gear; the output gear includes a second gear engaged with the second worm, and the cam device provided on a side end face of the second gear or provided on an extension shaft of the second gear; and the cam device is provided with a transmission shaft, and an axis of the transmission shaft is parallel to and dose not coincide with an axis of the second gear.

In an exemplary embodiment, a transmission ratio between the drive device and the second gear is 35/1 to 155/1.

In an exemplary embodiment, a rotation angle of the cam device is 18° to 95°.

In an exemplary embodiment, a mounting hole is provided at an end of the lock rod that is connected to the cam device, the mounting hole is in a closed state or open state, the transmission shaft is provided in the mounting hole, and the transmission shaft is capable of driving the mounting hole to drive the lock rod to perform a reciprocating movement.

In an exemplary embodiment, an inner surface of the mounting hole and an outer surface of the transmission shaft are provided with a wear-resistant plating layer; the first worm, the second worm, and the tooth surfaces of the first gear and the second gear are provided with a wear-resistant plating layer.

The present disclosure further provides an electronic lock, including an electronic lock housing and an electronic lock transmission structure as described above, the electronic lock transmission structure is provided in the electronic lock housing, a lock hole is provided on the electronic lock housing, the lock rod extends from the lock hole and performs a reciprocating movement; the electronic lock further includes a rack and a handle, a rotation shaft is provided on the rack, a rotation hole is provided at an axis center of the first gear facing away from the second worm and is sleeved on the rotation shaft, the rack is provided with a third gear engaged with the rack, a control rod is provided at an axis of the third gear, and an end of the control rod extends out of the electronic lock housing to be connected to the handle.

The present disclosure also provides a motor vehicle, including an electronic lock transmission structure as described above and/or an electronic lock as described above.

According to embodiments of the present disclosure, the electronic lock transmission structure disclosed is configured with a first worm and a second worm for transmission, which may provide a larger speed reduction ratio, thereby outputting a larger ejection force. The electronic lock disclosed in this embodiment is configured with a rack, and the rack is capable of driving a first gear to separate from the first worm when the entire electronic lock transmission structure is jammed, thereby resetting the electronic lock.

Other features and advantages of the present disclosure will become clear through the detailed illustration of the exemplary embodiments of the present disclosure with reference to the following drawings.

BRIEF DESCRIPTION OF DRAWINGS

The drawings, which are incorporated in and form part of the specification, illustrate embodiments of the disclosure, and together with descriptions of the drawings are used to illustrate the principle of the present disclosure.

DESCRIPTION OF REFERENCE SIGNS 1. drive device;
2. output shaft;
3. first worm;
4. cam device;
41. transmission shaft;
5. lock rod;
51. mounting hole;
61. first gear;
62. second worm;
7. second gear;
8. rack;
81. rotation shaft;
9. third gear;
91. control rod;
92. handle.

DESCRIPTION OF THE EMBODIMENTS

Now, various exemplary embodiments of the present disclosure are illustrated in details with reference to the drawings. It should be noted that unless otherwise specified, relative arrangements of the steps, numerical expressions In all the examples shown and discussed herein, any specific value should be illustrated as only exemplary and not as a limitation. Therefore, other examples of the exemplary embodiments may have different values.

Figure 1:
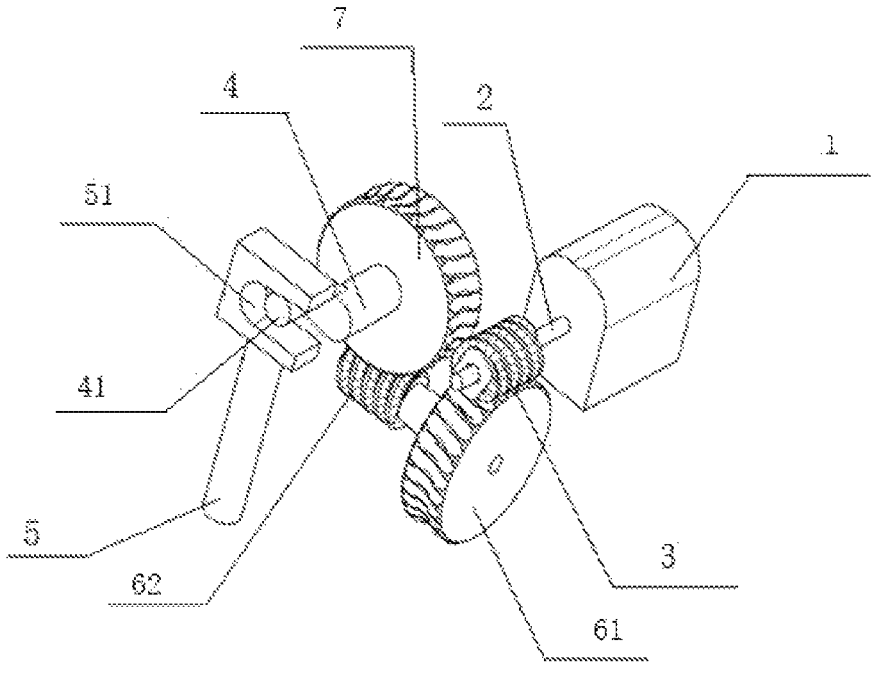
FIG. 1 is a structural schematic diagram of an electronic lock transmission structure according to an embodiment of the present disclosure.
Figure 2:
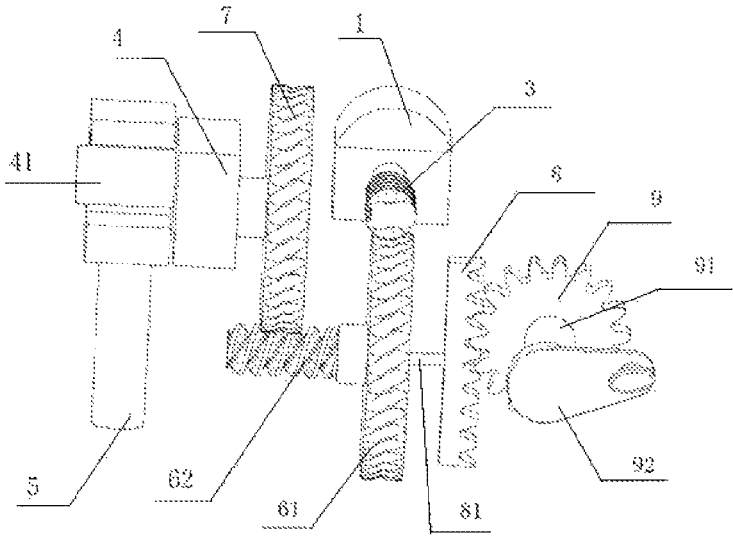
FIG. 2 is a structural schematic diagram of an electronic lock transmission structure according to another embodiment of the present disclosure.

An electronic lock transmission structure, as shown in FIG. 1 and FIG. 2, includes:

a drive device 1 with an output shaft 2;

a transmission mechanism comprising an input end and an output end connected in sequence, and the input end is a transmission assembly connected to the output shaft 2, and the output end is a cam device 4;

a lock rod 5, one end of which is a free end, and the other end of which is connected to the cam device 4; and rotation of the output shaft 2 is converted into a reciprocating movement of the lock rod 5 through the transmission mechanism.

Further, the transmission assembly is a first worm 3.

In this embodiment, the drive device 1 is a drive electric motor, and the transmission assembly is a first worm 3. When the drive electric motor is working, the output shaft 2 rotates, the input end of the transmission mechanism connected with the output shaft 2 cooperates with a output end to convert the rotation of the output shaft 2 into a reciprocating movement of the lock rod 5, so that the lock rod 5 can complete lock opening action and unlocking action by combining with a lock hole.

Specifically, reciprocating movement is one or more selected from telescoping, translating, rotating, swinging, bending and twisting. A mode of movement may be selected according to an actual use environment, provided that the reciprocating movement of the lock rod 5 can be achieved.

In an embodiment, an output torque of the output shaft 2 is 2.4 N·mm to 10.8 N·mm.

An output torque of the drive device 1 decides a magnitude of force applied to the transmission mechanism. If the torque is not enough, the lock rod 5 cannot be driven to work. In order to verify the influence of the drive devices 1 with different output torques on opening and closing of the lock rod 5, the inventor carried out a relevant test. The test method is to select the drive devices 1 with different output torques, and having the same other structures, and the drive device 1 that can normally drive the lock rod 5 to work is qualified, otherwise it is unqualified, and if abnormal sound appears when the transmission structure is working, it is also regarded as unqualified. A test result is shown in Table 1:

TABLE 1

| Whether the drive devices 1 with different output torques can normally drive the lock rod 5 to work. | | | | | | | | | | | | |
|---|---|---|---|---|---|---|---|---|---|---|---|---|
| Torque (N · mm) | 2.3 | 2.4 | 3.0 | 3.6 | 3.9 | 4.5 | 5.5 | 6.5 | 7.6 | 8.8 | 9.9 | 10.8 | 11 |
| Whether able to work | No | Yes | Yes | Yes | Yes | Yes | Yes | Yes | Yes | Yes | Yes | Yes | Yes |
| Whether abnormal sound appears | No | No | No | No | No | No | No | No | No | No | No | No | Yes | and numerical values expounded in these embodiments do not limit the scope of the present disclosure.

The following description of at least one exemplary embodiment is actually illustrative only and in no way constitutes any limitation on the present disclosure and its application or use.

Technologies, methods and devices known to persons skilled in the relevant fields may not be discussed in details, but where appropriate, the above technologies, methods and devices shall be considered as part of the specification.

As shown in Table 1, when the output torque of the drive device 1 is less than 2.4 N·mm, the lock rod 5 cannot be driven to work, so the inventor selected the minimum output torque of the drive device 1 to be 2.4 N·mm. When the output torque is greater than 10.8 N·mm, although the lock rod 5 can be driven to work, the output torque is too large, thereby appearing abnormal sound when the transmission structure is working, thus the output torque of the drive device 1 selected by the inventor is 2.4 N·mm to 10.8 n·mm.

It may exemplarily be 3.5 N·mm, 4 N·mm, 6 N·mm, 8 N·mm, and etc.

In some embodiments, an output power of the drive device 1 is 0.65 W to 6.2 W.

The output power of the drive device 1 decides a working speed of the transmission structure, the higher the power, the faster the transmission structure completes the work, the smaller the power, the slower the transmission structure completes the work, resulting in that a movement of the lock rod 5 cannot be completed. In order to test the influence of an output power on the work of the transmission structure, the inventor carried out a relevant test, the test method is to select the drive devices 1 with different output powers, and having the same structure of the transmission structure, each drive device 1 works continuously for 1 minute, the number of times of work completed by the transmission structure is recorded, if the number of times is greater than or equal to 40, it is qualified, and if the number of times is less than 40, it is unqualified. If abnormal sound appears when the transmission structure is working, it is also considered unqualified. A result is shown in Table 2.

TABLE 2

| Influence of different output powers on a working speed and abnormal sound of the transmission structure | | | | | | | | | | | | |
|---|---|---|---|---|---|---|---|---|---|---|---|---|
| Power (W) | 0.6 | 0.65 | 0.7 | 0.8 | 1.5 | 2.2 | 2.9 | 3.5 | 4.3 | 4.8 | 5.5 | 6.2 | 6.4 |
| The number of times of completion | 38 | 40 | 47 | 52 | 55 | 58 | 61 | 63 | 65 | 66 | 70 | 71 | 71 |
| Whether abnormal sound appears | No | No | No | No | No | No | No | No | No | No | No | No | Yes |

As shown in Table 2, when the output power of the drive device 1 is less than 0.65 W, the number of times of completed opening and closing by the transmission structure within 1 minute is less than 40, and the speed is too slow, it is unqualified. Therefore, the inventor selected the minimum power of the drive device 1 to be 0.65 W. When the output power of the drive device 1 is greater than 6.2 W, a speed of the transmission structure as affected by the overall design enters a bottleneck period, and has no obvious improvement, meanwhile abnormal sound appears, therefore the output power of the drive device 1 selected by the inventor is 0.65 W to 6.2 W. It may exemplarily be 0.9 W, 0.96 W, 1 W, 1.08 W, 2 W, 3 W, and etc.

In some implementations, the transmission mechanism further includes a transmission gear and an output gear, and the transmission gear comprises a first gear 61 engaged with the first worm 3, and a second worm 62 provided coaxially with the first gear 61; and the output gear comprises a second gear 7 engaged with the second worm 62, and the cam device 4 provided on a side end face of the second gear 7 or provided on an extension shaft of the second gear 7; the cam device 4 is provided with a transmission shaft 41, and an axis of the transmission shaft 41 is parallel to and dose not coincide with an axis of the second gear 7.

The drive device 1 drives the output shaft 2 to rotate, the first worm 3 rotates following the output shaft 2, and the first gear 61 engaged with the first worm 3 also rotates. The second worm 62 is provided coaxially with the first gear 61, so under the drive of the first gear 61, the second worm 62 also rotates, and drives the second gear 7 to rotate, thereby driving the cam device 4 to rotate. The cam device 4 has a transmission shaft 41 which is parallel to the axis of the second gear 7. In this way, when the second gear 7 rotates, the cam device 4 is capable of driving the lock rod 5 to work normally. Thus, the first gear 61 and the second gear 7 are helical gears.

Further, a transmission ratio between the drive device 1 and the second gear 7 is 35/1 to 155/1.

If the transmission ratio between the drive device 1 and the second gear 7 is too large, more response time is needed, and if the transmission ratio is too small, abnormal sound is easily appeared due to inaccurate control. Therefore, the inventor selected different transmission ratios of the drive device 1 to the second gear 7 for testing, and observed the number of times that the locking action or opening action of the lock rod 5 was completed within 1 minute, if the number of times is less than 40, it is unqualified, and if abnormal sound appears during the test, it is also unqualified. A result is shown in Table 3.

TABLE 3

| Influence of different transmission ratios of the drive device 1 to the second gear 7 on the number of times of completion | | | | | | | | | |
|---|---|---|---|---|---|---|---|---|---|
| Transmission ratio | 30/1 | 35/1 | 50/1 | 65/1 | 70/1 | 88/1 | 115/1 | 140/1 | 155/1 | 160/1 |
| The number of times of completion | 38 | 40 | 47 | 52 | 55 | 58 | 61 | 63 | 65 | 66 |
| Whether abnormal sound appears | No | No | No | No | No | No | No | No | No | Yes |

As can be known from Table 3, when the transmission ratio between the drive device 1 and the second gear 7 is too small, the number of times of a locking action or opening action completed by the lock rod 5 within 1 minute is less than 40, so it is unqualified. Meanwhile, when the transmission ratio between the drive device 1 and the second gear 7 is greater than 155/1, abnormal sound appears in the transmission structure, it is also unqualified. Therefore, the inventor selected the transmission ratio between the drive device 1 and the second gear 7 to be 35/1 to 155/1.

In an exemplary embodiment, a rotation angle of the cam device 4 is 18° to 95°.

A rotation angle of the cam device 4 can also decide a movement of the lock rod 5. When the rotation angle of the cam device 4 is too small, the movement of the lock rod 5 is not enough to complete the locking work. When the rotation angle of the cam device 4 is too large, after the lock rod 5 is stretched to a working position, the cam device 4 is still outputting a rotating force, which is easy to cause a damage to the transmission mechanism. In order to verify the influence of the rotation angle of the cam device 4 on the transmission structure, the inventor carried out a test, the test method is to prepare the drive devices 1 with different rotation angles of the cam device 4, and having the same other structures of the transmission structure, so that a locking action can be completed by a movement of the lock rod 5, it is qualified, otherwise it is unqualified. A larger rotation angle means a larger movement of the lock rod 5, correspondingly a size of each connection component needs to be increased, which is easy to cause a contact with other components in the transmission structure, thereby affecting use of the transmission structure. The rotation angle of the cam device 4 in this case is also regarded as unqualified, a test result is shown in Table 4:

TABLE 4

Influence of a rotation angle range of different cam devices on a function of the transmission structure and whether to contact with other components

| Rotation angle | 16 | 18 | 28 | 36 | 47 | 55 | 61 | 70 | 78 | 83 | 89 | 95 | 96 |
|---|---|---|---|---|---|---|---|---|---|---|---|---|---|
| Whether to lock | No | Yes | Yes | Yes | Yes | Yes | Yes | Yes | Yes | Yes | Yes | Yes | Yes |
| Whether to contact | No | No | No | No | No | No | No | No | No | No | No | No | Yes |

As can be known from Table 4, when the rotation angle of the cam device 4 is less than 18°, the movement of the lock rod is not enough to complete the locking work. When the rotation angle of the cam device 4 is greater than 95°, there will be unnecessary contact between components of the transmission structure, which will produce abnormal sound, it is also unqualified. Therefore, the inventor selected the rotation angle of the output end of the cam device 4 to be 18° and 95°. It may exemplarily be 0°, 60°, 70° or 80°, etc.

A mounting hole 51 is provided at an end of the lock rod 5 that is connected to the cam device 4, the mounting hole 51 is in a closed or open state, the transmission shaft 41 is provided in the mounting hole 51, and the transmission shaft 41 is capable of driving the mounting hole 51 to drive the lock rod 5 to perform a reciprocating movement.

The transmission shaft 41, as a part of the cam device 4, rotates when the cam device 4 rotates. By taking the reciprocating movement of the lock rod 5 perpendicular to a horizontal direction as an example, when the transmission shaft 41 rotates to an upper part in the mounting hole 51, the transmission shaft 41 contacts in a sliding manner with the upper part in the mounting hole 51, which drives the lock rod 5 to move upward to complete the unlocking action; when the transmission shaft 41 rotates to a lower part in the mounting hole 51, the transmission shaft 41 contacts in a sliding manner with the lower part in the mounting hole 51, which drives the lock rod 5 to move downward to complete the locking action.

Further, an inner surface of the mounting hole 51 and an outer surface of the transmission shaft 41 are provided with a wear-resistant plating layer; the first worm 3, the second worm 62, and the tooth surfaces of the first gear 61 and the second gear 7 are provided with a wear-resistant plating layer.

Further, a material of the wear-resistant plating layer comprises a ceramic, an alloy, an oxide or a fluoroplastic.

Exemplarily, the wear-resistant plating layer comprises one or more selected from gold, silver, nickel, tin, tin-lead alloy, zinc, silver-antimony alloy, palladium, palladium-nickel alloy, graphite-silver, hard silver, graphene-silver, and silver-gold-zirconium alloy.

For the corrosion resistance time test in the following Table 5, a relevant test sample is put into a salt mist spraying test chamber, salt mist is sprayed on each position of the test sample, the test sample is taken out and cleaned every 20 hours, the surface corrosion of the test sample is observed, i.e., a cycle, until the surface corrosion area of the test sample is greater than 10% of the total area, the test is stopped, and the number of cycles at that time is recorded. In this embodiment, it is unqualified if the number of cycles is less than 80. For the number of frictions in Table 5, the test sample is fixed on an experiment table, and after every 100 times of a contact friction test, it is necessary to stop and observe a damage of the wear-resistant plating layer of the test sample. If a scratch appears and a material of the test sample itself is exposed, the experiment is stopped and the number of frictions at that time is recorded. In this embodiment, it is unqualified if the number of frictions is less than 8000.

TABLE 5

| Influence of the number of frictions and corrosion resistance on the test samples with different plating layer materials | | | | | | | | | | | | |
|---|---|---|---|---|---|---|---|---|---|---|---|---|
| Different wear-resistant plating layer materials | | | | | | | | | | | | |
| hard silver | gold | silver | nickel | tin | tin-lead alloy | zinc | silver-antimony alloy | palladium | palladium-nickel alloy | graphite-silver | graphene-silver | silver-gold-zirconium alloy |
| The number of frictions | | | | | | | | | | | | |
| 12800 | 1200 | 11800 | 9500 | 9200 | 9800 | 9500 | 12100 | 12100 | 12200 | 12500 | 12200 | 11000 |
| Number of cycles of the corrosion resistance test | | | | | | | | | | | | |
| 133 | 135 | 122 | 91 | 88 | 89 | 95 | 124 | 116 | 121 | 129 | 130 | 133 |

As can be seen from the above Table 5, when a material of the plating layer is selected to be gold, silver, silver-antimony alloy, palladium, palladium-nickel alloy, graphite-silver, hard silver, graphene-silver and silver-gold-zirconium alloy, an experiment result exceeds a standard value more, and the performance is more stable. When the material of the plating layer is selected to be nickel, tin, tin-lead alloy and zinc, the experiment result may also meet the requirements, thus the inventor selects that the material of the plating layer is one or more selected from gold, silver, nickel, tin, tin-lead alloy, zinc, hard silver, silver-antimony alloy, palladium, palladium-nickel alloy, graphite-silver, graphene-silver and silver-gold-zirconium alloy.

The present disclosure further provides an electronic lock, including an electronic lock transmission structure as described above and an electronic lock housing, the electronic lock transmission structure is provided in the electronic lock housing, a lock hole is provided on the electronic lock housing, the lock rod extends from the lock hole and performs a reciprocating movement;

the electronic lock further includes a rack 8 and a handle 92, as shown in FIG. 2, a rotation shaft 81 is provided on the rack 8, a rotation hole is provided at an axis center of the first gear 61 facing away from the second worm 62 and is sleeved on the rotation shaft 81, the rack 8 is provided with a third gear 9 engaged with the rack, a control rod 91 is provided at an axis of the third gear 9, and an end of the control rod 91 extends out of the electronic lock housing to be connected to the handle 92.

When the electronic lock is jammed for some reason, the handle 92 may be rotated outside the electronic lock housing, to drive the control rod 91 to rotate, thereby driving the third gear 9 to rotate, so that the rack 8 engaged with the third gear 9 will carry out a linear motion, the rotation shaft 81 drives the first gear 61 to translate through the rotation hole, thereby separating the first gear 61 from the first worm 3, so as to solve jamming of an internal structure of the electronic lock. When the electronic lock is working normally, the first gear 61 rotates and the rotation hole rotates around the rotation shaft 81, so the rack 8 will not affect the normal operation of the first gear 61.

The present disclosure further provides a motor vehicle, including an electronic lock transmission structure as described above and/or an electronic lock as described above.

Although some exemplary embodiments of the present disclosure have been detailed through examples, persons skilled in the art should understand that the above examples are intended only for illustration but are not for limiting the scope of the present disclosure. Persons skilled in the art should understand that the above embodiments may be modified without deviating from the scope and spirit of the present disclosure. The scope of the present disclosure is defined by the attached claims.

The invention claimed is:

1. An electronic lock transmission structure, comprising:
a drive device with an output shaft;
a transmission mechanism comprising an input end and an output end, wherein the input end is a transmission assembly connected to the output shaft, and the output end is a cam device; and
a lock rod, one end of which is a free end, and the other end of which is connected to the cam device;
wherein rotation of the output shaft is converted into a reciprocating movement of the lock rod through the transmission mechanism,
wherein the transmission assembly is a first worm,
wherein the transmission mechanism further comprises a transmission gear and an output gear;
the transmission gear comprises a first gear engaged with the first worm, and a second worm provided coaxially with the first gear;
the output gear comprises a second gear engaged with the second worm, and the cam device provided on a side end face of the second gear or provided on an extension shaft of the second gear; and
the cam device is provided with a transmission shaft, and an axis of the transmission shaft is parallel to and does not coincide with an axis of the second gear.

2. The electronic lock transmission structure according to claim 1, wherein the reciprocating movement is one or more selected from telescoping, translating, rotating, swinging, bending and twisting.

3. The electronic lock transmission structure according to claim 1, wherein an output torque of the output shaft is 2.4 N·mm to 10.8 N·mm.

4. The electronic lock transmission structure according to claim 1, wherein an output power of the drive device is 0.65 W to 6.2 W.

5. The electronic lock transmission structure according to claim 1, wherein a transmission ratio between the drive device and the second gear is 35/1 to 155/1.

6. The electronic lock transmission structure according to claim 1, wherein a rotation angle of the cam device is 18° to 95°.

7. The electronic lock transmission structure according to claim 1, wherein a mounting hole is provided at an end of the lock rod that is connected to the cam device, the mounting hole is in a closed or open state, the transmission shaft is provided in the mounting hole, and the transmission shaft is capable of driving the mounting hole to drive the lock rod to perform a reciprocating movement.

8. The electronic lock transmission structure according to claim 7, wherein an inner surface of the mounting hole and an outer surface of the transmission shaft are provided with a wear-resistant plating layer; and the first worm, the second worm, and tooth surfaces of the first gear and the second gear are provided with a wear-resistant plating layer.

9. An electronic lock, comprising an electronic lock housing and an electronic lock transmission structure according to claim 1, the electronic lock transmission structure is provided in the electronic lock housing, a lock hole is provided on the electronic lock housing, the lock rod extends from the lock hole and performs a reciprocating movement; and the electronic lock further comprises a rack and a handle, a rotation shaft is provided on the rack, a rotation hole is provided at an axis center of an end of the first gear facing away from the second worm and is sleeved on the rotation shaft, the rack is provided with a third gear engaged with the rack, a control rod is provided at an axis of the third gear, and an end of the control rod extends out of the electronic lock housing to be connected to the handle.

10. The electronic lock according to claim 9, wherein a transmission ratio between the drive device and the second gear is 35/1 to 155/1.

11. The electronic lock according to claim 9, wherein a rotation angle of the cam device is 18° to 95°.

12. The electronic lock according to claim 11, wherein an inner surface of the mounting hole and an outer surface of the transmission shaft are provided with a wear-resistant plating layer; and the first worm, the second worm, and tooth surfaces of the first gear and the second gear are provided with a wear-resistant plating layer.

13. The electronic lock according to claim 9, wherein a mounting hole is provided at an end of the lock rod that is connected to the cam device, the mounting hole is in a closed or open state, the transmission shaft is provided in the mounting hole, and the transmission shaft is capable of driving the mounting hole to drive the lock rod to perform a reciprocating movement.

14. A motor vehicle, comprising an electronic lock transmission structure and/or an electronic lock; wherein the electronic lock transmission structure comprises a drive device with an output shaft;

a transmission mechanism comprising an input end and an output end, wherein the input end is a transmission assembly connected to the output shaft, and the output end is a cam device; and a lock rod, one end of which is a free end, and the other end of which is connected to the cam device;

wherein rotation of the output shaft is converted into a reciprocating movement of the lock rod through the transmission mechanism, wherein the transmission assembly is a first worm, wherein the transmission mechanism further comprises a transmission gear and an output gear;

the transmission gear comprises a first gear engaged with the first worm, and a second worm provided coaxially with the first gear;

the output gear comprises a second gear engaged with the second worm, and the cam device provided on a side end face of the second gear or provided on an extension shaft of the second gear; and the cam device is provided with a transmission shaft, and an axis of the transmission shaft is parallel to and does not coincide with an axis of the second gear;

wherein the electronic lock comprises an electronic lock housing and the electronic lock transmission structure, the electronic lock transmission structure is provided in the electronic lock housing, a lock hole is provided on the electronic lock housing, the lock rod extends from the lock hole and performs a reciprocating movement; and the electronic lock further comprises a rack and a handle, a rotation shaft is provided on the rack, a rotation hole is provided at an axis center of an end of the first gear facing away from the second worm and is sleeved on the rotation shaft, the rack is provided with a third gear engaged with the rack, a control rod is provided at an axis of the third gear, and an end of the control rod extends out of the electronic lock housing to be connected to the handle.

15. The motor vehicle according to claim 14, wherein a mounting hole is provided at an end of the lock rod that is connected to the cam device, the mounting hole is in a closed or open state, the transmission shaft is provided in the mounting hole, and the transmission shaft is capable of driving the mounting hole to drive the lock rod to perform a reciprocating movement.

16. The motor vehicle according to claim 15, wherein an inner surface of the mounting hole and an outer surface of the transmission shaft are provided with a wear-resistant plating layer; and the first worm, the second worm, and tooth surfaces of the first gear and the second gear are provided with a wear-resistant plating layer.

* * * * *